Jan. 2, 1945.  O. T. ANDREWS  2,366,230
HAY BALER
Filed July 13, 1942  2 Sheets-Sheet 1
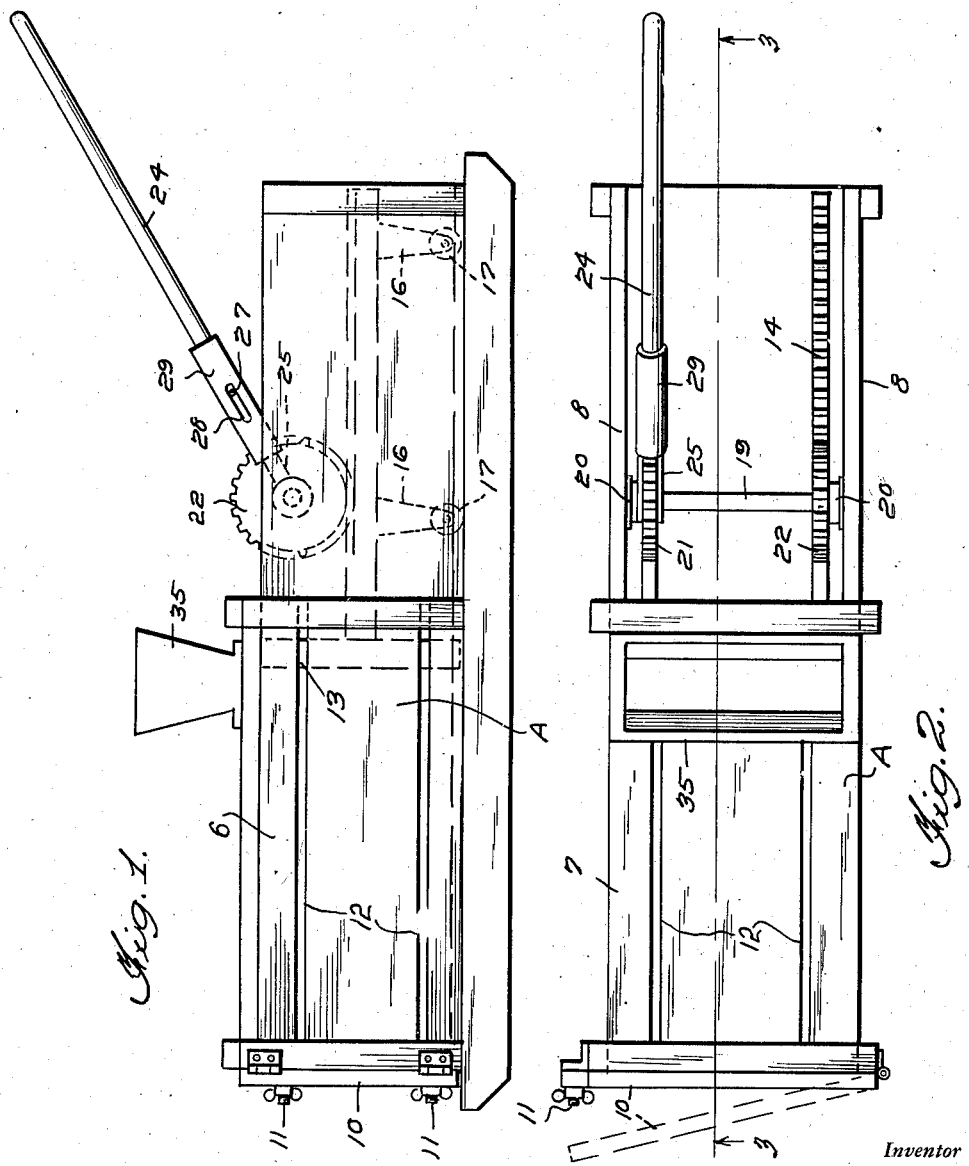
Inventor
Ollie T Andrews
By Clarence A O'Brien
and Harvey B. Jacobson
Attorneys Jan. 2, 1945. O. T. ANDREWS 2,366,230
HAY BALER
Filed July 13, 1942 2 Sheets-Sheet 2
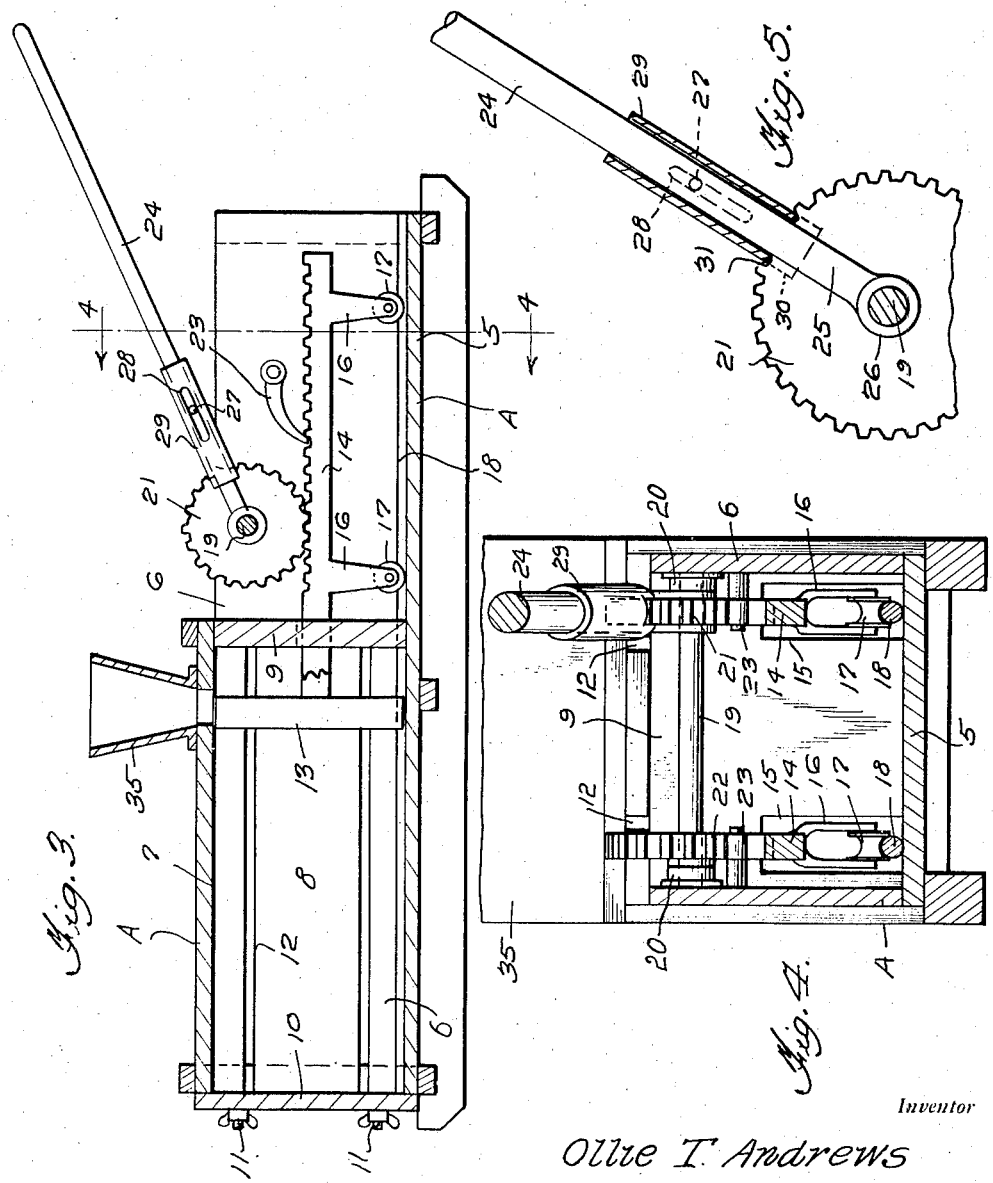
Inventor
Ollie T. Andrews
By Clarence A. O'Brien
and Harvey B. Jacobson
Attorneys Patented Jan. 2, 1945

2,366,230

UNITED STATES PATENT OFFICE 2,366,230

HAY BALER

Ollie T. Andrews, Marion, La.

Application July 13, 1942, Serial No. 450,741

1 Claim. (Cl. 100—5)

This invention relates to new and useful improvements in balers especially adapted for baling hay and like material.

The principal object of the present invention is to provide a baler which will permit the baling of hay and like material in a quick, uniform and substantially effortless manner.

Another important object of the invention is to provide a hay baler of simple design which will cost substantially less to manufacture than conventional balers.

Another important object of the invention is to provide a hay baler especially adapted for use by small farmers who cannot afford more complicated and costly balers such as the market at present presents.

Other objects and advantages of the invention will become apparent to the reader of the following description.

In the drawings:

Figure 1 is a side elevational view.

Figure 2 is a top plan view.

Figure 3 is a section on the line 3—3 of Figure 2.

Figure 4 is a cross section on the line 4—4 of Figure 3.

Figure 5 is a fragmentary detailed sectional view through the drive means.

Referring to the drawings wherein like numerals designate like parts, it can be seen that the present invention includes a box A made up of a bottom wall 5, side walls 6 and a top wall 7 which extends for half the length of the entire box. The top wall 7 defines the length of the compression chamber 8, at one end of which is a vertical partition 9 and at its opposite end a hinged door 10 through which baled hay can be moved. Suitable clamp or detent means 11 is provided for the door 10. Numeral 12 denotes slots to accommodate the tie wires for the compressed hay.

Operative in the compression chamber 8 is a presser or follower 13 from which extends elongated racks 14, 14 slidable through openings 15 in the partition 9. These racks 14 have depending legs 16 at the lower ends of which are mounted grooved rollers 17 riding on rods or rounded tracks 18.

Extending transversely between the side walls 6 of the box 5 is a shaft 19 having its ends journaled in bearings 20 and having a pair of gear wheels 21, 22 thereon meshing with the teeth of the corresponding racks 14. In Figure 3, may be seen a non-return dog or pawl 23 which rides one of the rack bars 14 to prevent return of the follower 13. A similar pawl 23 cooperates with the other rack bar 14, as shown in Figure 4.

An elongated hand bar 24 is bifurcated at its lower end to provide straddling legs 25 straddling the gear 21 and having collars or annular structures 26 through which the shaft 19 is disposed.

A cross pin 27 is provided on the hand bar 24 and has its end portions projecting laterally and into slots 28 in opposite side portions of a sleeve 29. This sleeve 29 has its lower portion bifurcated as at 30 so as to straddle the peripheral portion of the gear 21 so that the edge portions 31 of the sleeve 29 will act as teeth meshing with the teeth of the gear 21.

Obviously by lifting the sleeve 29 and moving the bar to the left in Figure 3, and then dropping the sleeve 29, the sleeve will connect the bar 24 with the gear 21, so that when the bar is moved toward the right in Figure 3, the consequent rotation of the gear 21 and the gear 22 by the shaft 19 cause movement of the rack bars 14 to the left in Figure 3, moving the follower 13 against hay which has been deposited in the compression chamber 8 through the hopper 35.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A hay baler comprising an elongated box-like structure including a bottom and side walls, and a closed compression chamber occupying substantially one-half the length of the structure, the remaining half being open at the top thereof, a follower in said chamber, a pair of rack bars extending horizontally from said follower out of said chamber into said open-top half of the structure contiguous the side walls, a pair of rod-like tracks fixed to the bottom of the structure in said open-top half contiguous said side walls, longitudinally spaced legs depending from the rack bars and having roller-equipped lower ends riding on said tracks, a pair of axially aligned gear wheels mounted on said side walls and meshing with said rack bars, and means to rotate said gears in unison in opposite directions, respectively, including a hand bar extending upwardly out of said open-top.

OLLIE T. ANDREWS.